United States Patent
Canos et al.

(10) Patent No.: US 6,231,751 B1
(45) Date of Patent: May 15, 2001

(54) OXIDE MATERIALS AND CATALYST COMPOSITIONS CONTAINING THEM

(75) Inventors: Avelino Corma Canos; Vicente Fornes Segui; Sibelle Berenice Castella Pergher, all of Valencia (ES)

(73) Assignee: Universidad Politecnica de Valencia, Valencia (ES)

( * ) Notice: Subject to any disclaimer, the term of this patent is extended or adjusted under 35 U.S.C. 154(b) by 0 days.

(21) Appl. No.: 09/068,289

(22) PCT Filed: Nov. 8, 1996

(86) PCT No.: PCT/EP96/05004

§ 371 Date: Oct. 28, 1998

§ 102(e) Date: Oct. 28, 1998

(87) PCT Pub. No.: WO97/17290

PCT Pub. Date: May 15, 1997

(30) Foreign Application Priority Data

Nov. 8, 1995 (ES) ............................................. P 9502188

(51) Int. Cl.[7] ........................... C10G 11/04; C10G 11/05; C01B 33/20; B01J 21/00
(52) U.S. Cl. .................... 208/120.01; 208/118; 208/119; 502/245; 502/263; 423/328.1; 423/328.2
(58) Field of Search .............................. 423/328.1, 328.2; 208/118, 119, 120.01, 120.3, 120.35; 502/245, 263

(56) References Cited

U.S. PATENT DOCUMENTS

| | | | |
|---|---|---|---|
| 4,954,325 | 9/1990 | Rubin et al. | 423/328 |
| 4,956,514 | 9/1990 | Chu | 585/533 |
| 4,992,615 | 2/1991 | Huss, Jr. et al. | 585/722 |
| 5,077,254 | 12/1991 | Travers et al. | 502/66 |
| 5,107,047 | 4/1992 | Del Rossi et al. | 585/666 |
| 5,236,575 | 8/1993 | Bennett et al. | 208/46 |
| 5,250,277 | 10/1993 | Kresge et al. | 423/329.1 |
| 5,264,643 | 11/1993 | DiGuiseppi et al. | 585/533 |
| 5,382,742 | * 1/1995 | Morrison et al. | 585/654 |
| 5,493,065 | 2/1996 | Cheng et al. | 585/467 |
| 5,516,962 | * 5/1996 | Chu et al. | 585/722 |

FOREIGN PATENT DOCUMENTS

| | | |
|---|---|---|
| 0363253 | 4/1990 | (EP) . |
| WO 92/11934 | 7/1992 | (WO) . |
| WO 92/22498 | 12/1992 | (WO) . |
| WO 94/29245 | 12/1994 | (WO) . |

OTHER PUBLICATIONS

Chemical Abstracts, vol. 83, No. 2, Jul. 14, 1975, Columbus, Ohio, US, Abstract No. 12898, Cruceanu, Mihai et all, "Synthesis of the Molecular Sieves in Ultrasonic Field," XP002027536 and article.

Chemical Abstracts, vol. 105, No. 2, Jul. 14, 1986, Columbus, Ohio, US, Abstract No. 8764, Ueda, Yoshinobu et al., "Manufacture of Molecular–Sieve Zeolites," XP002027537.

Database WPI, Section Ch, Week 9219, Derwent Publications Ltd., London, GB, Class D25, AN 92–156915, XP002027538, & JP 04 097 908 A (Lion Corp), Mar. 30, 1992.

* cited by examiner

*Primary Examiner*—Walter D. Griffin
(74) *Attorney, Agent, or Firm*—Thomason, Moser & Patterson, L.L.P.

(57) ABSTRACT

A process for making a calcined, oxide material by at least partially delaminating a swollen, layered oxide material prior to calcination, and the product thereof having an increased active surface area that corresponds to an adsorption capacity for 1,3,5-trimethylbenzene of at least 0.50 mmol/g at a temperature of 42° C. and a pressure of 173.3 Pa. The calcined, oxide material retains a porous shape although non-pillared.

20 Claims, No Drawings

OXIDE MATERIALS AND CATALYST COMPOSITIONS CONTAINING THEM

The present invention relates to oxide materials, a process for their preparation, catalyst compositions containing them and use of the catalyst compositions in a process for catalytically cracking a hydrocarbonaceous feedstock.

Laminar materials that swell or expand in the presence of water and/or appropriate intercalating cations are exemplified by clays, zirconium phosphates and phosphonates, hydroxycarbonates such as hydrotalcite, silicas such as kanemite, magadiite and keniaite, transition metal sulphides, graphite and laminar hydroxides. The individual layers of these materials are linked together by weak bonds such as hydrogen bonds and electrostatic forces which are easily ruptured when the intercalating force or the solvation energy of the cations exceeds the force of attraction between the layers. This is the case for example with sodium montmorillonite which swells in the presence of excess water until the distance between its layers exceeds 10 nm (100 Å). An advantage of such swellable or expandable materials, particularly those having catalytic uses, is that the space between their layers and so their internal surface can be made accessible to reactive molecules, thereby considerably increasing the catalytically active surface area of the material. However, when the intercalated cations in the swollen or expanded laminar material are eliminated by calcination, the laminar material collapses and the original spacing between the layers is re-established.

In order to prevent this collapse between the layers on calcination, it has been proposed in the art to intercalate in the swelled or expanded laminar material some "columns" or "pillars" of thermostable hydroxides and oxides. These columns consist of polymeric hydroxides, for example, of aluminium, silicon, chromium, nickel or zirconium. On calcination, these hydroxides give rise to columns of the corresponding oxides which are anchored in the surface of the layers, keeping them at a certain distance from one another. This stabilises the final product which is known as a "pillared laminar material". The preparation of a pillared laminar oxide material, in particular MCM-36, is described in detail in Published International Patent Application No. WO 92/11934.

It would be desirable to prepare a calcined, oxide material having an increased active surface area which is not a pillared material.

In accordance with the present invention, there is therefore provided an oxide material having in its calcined form an X-ray diffraction pattern including values substantially as set forth in Table I below:

TABLE I

| d (Ångstrom) | Relative Intensity, $I/I_o \times 100$ |
|---|---|
| 12.49 ± 0.24 | vs |
| 11.19 ± 0.22 | m–s |
| 6.43 ± 0.12 | w |
| 4.98 ± 0.10 | w |
| 4.69 ± 0.09 | w |
| 3.44 ± 0.07 | vs |
| 3.24 ± 0.06 | w | and an adsorption capacity for 1,3,5-trimethylbenzene at a temperature of 42° C. and a pressure of 173.3 Pa.(1.3 torr) of least 0.50 mmol/g, preferably at least 0.60 mmol/g, more preferably at least 0.70 mmol/g, still more preferably at least 0.80 mmol/g and especially at least 1.00 mmol/g, in particular 1.02 mmol/g.

In this specification, unless otherwise stated, the relative intensities as indicated by the symbols, w, m, s and vs denote respectively weak, medium, strong and very strong and correspond generally to the following values:

w=0–20 m=20–40 s=40–60 vs=60–100

The X-ray diffraction pattern of the oxide material of the invention has substantially no peaks with a relative intensity $(I/I_o \times 100)$ greater than about 5 at d-values higher than 15 Ångstrom.

The oxide material according to the present invention is characterised by a high active surface area and a microporous structure. It possesses channels formed by 10-membered atomic rings having a pore diameter of 0.56 nm (5.6 Å), and chalice-shaped cavities that measure 0.8× 0.7 nm (8×7 Å) which are open to the outside via 12-membered atomic rings, as indicated by the high adsorption capacity for the bulky molecule 1,3,5-trimethylbenzene. By comparison, MCM-22 zeolite has an adsorption capacity for 1,3,5-trimethylbenzene at a temperature of 42° C. and a pressure of 173.3 Pa (1.3 torr) of 0.25 mmol/g. Similarly, the oxide material of the invention possesses higher adsorption capacities than MCM-22 zeolite for toluene (e.g. 2.10 mmol/g versus 1.46 mmol/g at 42° C. and 1333.2 Pa (10 torr)) and meta-xylene (e.g. 1.58 mmol/g versus 0.79 mmol/g at 42° C. 666.61 Pa (5 torr)).

Adsorption capacities were determined from microcalorimetric measurements of the differential heat of adsorption of an adsorbate (>99% purity) as a function of its uptake on 100 mg samples of oxide material. Conventional volumetric apparatus was used together with a heat-flow microcalorimeter of the Tian-Calvet type (model BT, Setaram, France). Before each experiment, the sample material was heated in an oxygen flow (30 cm³/min) up to 450° C. and outgassed overnight at 450° C. in a vacuum less than 1 mPa. Isotherms were determined in the usual way by measuring amounts adsorbed at increasing pressures and the corresponding heat evolved with each dose of adsorbate. The experiments were carried out at a temperature of 42° C.

Preferably the oxide material of the invention comprises the oxides $XO_2$ and $Y_2O_3$ wherein X represents a tetravalent element and Y represents a trivalent element, the atomic ratio X to Y being at least 10.

Preferably X in $XO_2$ represents at least one tetravalent element selected from silicon and germanium, and is especially silicon.

Preferably Y in $Y_2O_3$ represents at least one trivalent element selected from aluminium, boron, iron, chromium and gallium, and is especially aluminium.

A particularly preferred oxide material is one comprising the oxides $SiO_2$ and $Al_2O_3$, i.e. wherein X represents silicon and Y represents aluminium.

The atomic ratio X to Y may take any value from 10 to infinity but is preferably a value in the range from 10 to 500, more preferably in the range from 10 to 350, still more preferably in the range from 10 to 150 and especially in the range from 10 to 100. Very advantageous results have been obtained when the atomic ratio X to Y is in the range from 15 to 50.

The present invention further provides a process for the preparation of an oxide material according to the invention which comprises, prior to calcination, at least partially delaminating a swollen, layered oxide material having an X-ray diffraction pattern including values substantially as set forth in Table II below:

Table II

| d (Ångstrom) | Relative Intensity, I/I$_o$ × 100 |
|---|---|
| >32.2 | vs |
| 12.41 ± 0.25 | w–s |
| 3.44 ± 0.07 | w–s |

The swollen, layered oxide material having the X-ray diffraction pattern of Table II is preferably at least partially delaminated using ultrasound techniques.

The swollen, layered oxide material may conveniently be prepared as described in Published International patent application No. WO 92/11934 from a precursor of MCM-22 zeolite as known, e.g., from U.S. Pat. Nos. 4,954,325, 4,992,615, 5,107,047 and 4,956,514. When this precursor is calcined at temperatures in excess of 200° C., it collapses, giving rise to zeolite MCM-22 with a three-dimensional structure.

The MCM-22 precursor may be prepared from a reaction mixture containing an oxide of a tetravalent element (X), e.g. silicon, an oxide of a trivalent element (Y), e.g. aluminium, an organic directing agent (organic template), water and, optionally, sources of alkali or alkaline earth metal (M), e.g. sodium or potassium cation.

Examples of organic templates that may be used include heterocyclic imines (e.g. hexamethyleneimine, 1,4-diazacycloheptane and azacyclooctane), cycloalkyl amines (e.g. aminocyclopentane, aminocyclohexane and aminocycloheptane), adamantane quarternary ammonium ions (e-.g. N,N,N-trimethyl-1-adamantanammonium ions and N,N,N-trimethyl-2-adamantanammonium ions), and mixtures of N,N,N-trimethyl-1-adamantanammonium ions or N,N,N-trimethyl-2-adamantanammonium ions with either hexamethyleneimine or dipropylamine.

The reaction mixture is allowed to crystallise at a temperature in the range from 80 to 225° C. for a period of 1 to 60 days. The crystals that form are separated from the reaction mixture, washed thoroughly with water and dried to yield the MCM-22 precursor.

To obtain the swollen, layered oxide material having the X-ray diffraction pattern of Table II, the MCM-22 precursor is contacted in an exchange reaction with a long-chain organic compound to keep its layers widely spaced and so reduce the forces of attraction that hold them together.

The long-chain organic compound may be any suitable amine or alkylammonium compound such as octyltrimethylammonium compounds, dodecyltrimethylammonium compounds and cetyltrimethylammonium compounds, particularly cetyltrimethylammonium hydroxide, chloride or bromide.

The exchange reaction is conveniently carried out by contacting a solid suspension of the MCM-22 precursor with a solution of the long-chain organic compound, e.g. a mixture of cetyltrimethylammonium bromide and cetyltrimethylammonium hydroxide, and a solution of an alkylammonium compound, e.g. tetrapropylammonium hydroxide, at a temperature in the range from 40 to 150° C. for a period of several hours, e.g., 5 to 50 hours to yield, as product, a swollen, layered oxide material having the X-ray diffraction pattern of Table II.

When the swollen, layered oxide material is at least partially delaminated, for example, by using ultrasound treatment, e.g., at a power of 50 W for 15 minutes to 1 hour, and subsequently calcined, the product obtained is an oxide material according to the present invention.

Calcination may be carried out in air or an inert gas such as nitrogen at elevated temperature, e.g., at a temperature in the range from 200 to 800° C., for a period, e.g., from 1 to 48 hours. The calcination is conveniently carried out in nitrogen gas at 540° C. for 5 hours.

In a preferred aspect of the invention, the present process also comprises an acid treatment step following the delamination step and prior to calcination.

The acid treatment step may conveniently be carried out by contacting the at least partially delaminated swollen, layered oxide material having the X-ray diffraction pattern of Table II with a strong acid, e.g. a mineral acid such as hydrochloric acid or nitric acid, at low pH, e.g. pH 2, in order to flocculate the very small particles of oxide material. The oxide material thus acidified is then washed with water until a pH of 6 or more is obtained before being calcined.

In a further aspect of the invention, the present process also comprises a hydrothermal (steam) treatment step and/or a fluorine/phosphorus treatment step in accordance with techniques conventional in the art. These treatments are preferably carried out post-calcination as opposed to pre-calcination.

The oxide material according to the present invention exhibits unique characteristics that are very different from those of zeolite MCM-22 as regards its surface area, porosity, acidity, thermal stability and catalytic behaviour.

Tables 1 and 2 below compare the surface areas in m$^2$/g of calcined samples (carried out at 540° C. for 5 hours) of MCM-22 zeolite and the oxide material of the present invention, the latter having been prepared with (Table 2) and without (Table 1) an acid treatment from different MCM-22 precursors with silicon to aluminium atomic ratios from 15 to 100. The surface areas were determined by the well known Brunauer-Emmett-Teller (BET) method (S. Brunauer, P. Emmett and E. Teller, J. Am. Chm. Soc., 60, 309 (1938)) and the t-plot method, using nitrogen as the adsorbate.

TABLE 1

(without acid treatment)

| Sample | Si/Al atomic ratio of MCM-22 precursor | Total surface area | Microporous surface area | External surface area |
|---|---|---|---|---|
| MCM-22 | 15 | 453 | 312 | 141 |
| Invention | 15 | 515 | 223 | 292 |
| MCM-22 | 50 | 451 | 355 | 96 |
| Invention | 50 | 592 | 240 | 352 |

TABLE 2

(with acid treatment)

| Sample | Si/Al atomic ratio of MCM-22 precursor | Total surface area | Microporous surface area | External surface area |
|---|---|---|---|---|
| MCM-22 | 15 | 453 | 312 | 141 |
| Invention | 15 | 637 | 219 | 418 |
| MCM-22 | 25 | 448 | 339 | 109 |
| Invention | 25 | 632 | 150 | 482 |
| MCM-22 | 50 | 451 | 355 | 96 |

TABLE 2-continued (with acid treatment)

| Sample | Si/Al atomic ratio of MCM-22 precursor | Total surface area | Microporous surface area | External surface area |
|---|---|---|---|---|
| Invention | 50 | 841 | 45 | 796 |
| MCM-22 | 100 | 455 | 379 | 76 |
| Invention | 100 | 698 | 150 | 548 |

The data presented in Tables 1 and 2 clearly show that delamination reduces the microporous surface area and greatly increases the external surface area compared with the values obtained for zeolite MCM-22.

Table 3 below shows the amount of pyridine adsorbed in mmol pyridine per gram at three different temperatures by calcined samples (carried out at 540° C. for 5 hours) of MCM-22 zeolite and the oxide material of the present invention, the latter having been prepared with or without an acid treatment from two MCM-22 precursors with silicon to aluminium atomic ratios of 15 and 50. (For the adsorption coefficient, see C. A. Emeis, J. Cata., 141, 347–354 (1993).)

TABLE 3

| Sample | Si/Al atomic ratio of MCM-22 precursor | Temperature (° C.) | | | | | |
|---|---|---|---|---|---|---|---|
| | | 150 | | 250 | | 350 | |
| | | B | L | B | L | B | L |
| Invention* | 15 | 27 | 11 | 22 | 9 | 15 | 9 |
| Invention* | 50 | 21 | 24 | 16 | 20 | 7 | 15 |
| MCM-22 | 15 | 78 | 29 | 63 | 24 | 45 | 20 |
| Invention# | 15 | 72 | 49 | 51 | 29 | 33 | 23 |
| MCM-22 | 50 | 39 | 23 | 24 | 15 | 15 | 14 |
| Invention# | 50 | 21 | 23 | 15 | 20 | 9 | 15 |

*denotes without acid treatment
denotes with acid treatment
B denotes Brönsted acidity
L denotes Lewis acidity The oxide material according to the present invention may be used as a catalyst in organic conversion processes, e.g. in the catalytic cracking of hydrocarbonaceous feedstocks, and may be used alone or in combination with other catalyst components.

Accordingly, the present invention further provides a catalyst composition comprising an oxide material according to the present invention and a matrix material.

The matrix material may be an active or inactive material and may be either synthetic or naturally-occurring.

Examples of matrix materials that may be employed in the catalyst composition of the invention include clays (e.g. bentonite and kaolin) and inorganic refractory oxides (e.g. silica, alumina, magnesia, titania, zirconia, silica-alumina, silica-magnesia, silica-titania, silica-zirconia, silica-thoria, silica-beryllia as well as ternary compositions such as silica-alumina-thoria, silica-alumina-zirconia, silica-alumina-magnesia and silica-magnesia-zirconia).

The relative proportions of the oxide material of the invention and matrix material in the catalyst composition may vary widely. Thus, for example, the catalyst composition may comprise from 0.5 to 95% w, preferably from 1 to 80% w of the present oxide material and from 5 to 99.5% w, preferably from 20 to 99% w of matrix material, all percentages by weight being calculated on the basis of the combined dry weight of the present oxide material and the matrix material.

Depending on its application, the catalyst composition of the invention may further comprise at least one catalytically-active metal component. Examples of catalytically-active metal components that may be used include Group VIB (e.g. molybdenum and tungsten) and Group VIII metals (e.g. cobalt, nickel, iridium, platinum and palladium), their oxides and sulphides. The catalyst composition may contain up to 50 parts by weight of catalytically-active metal component, calculated as metal per 100 parts by weight of total catalyst composition. For example, the catalyst composition may contain from 2 to 40, preferably from 5 to 30, parts by weight of Group VIB metal(s) and/or from 0.05 to 10, preferably from 1 to 6, parts by weight of Group VIII metal(s), calculated as metal per 100 parts by weight of total catalyst composition.

The catalyst composition of the invention may be prepared in accordance with techniques conventional in the art.

The present invention still further provides a process for catalytically cracking a hydrocarbonaceous feedstock which comprises contacting the feedstock at elevated temperature with a catalyst composition according to the invention.

The hydrocarbonaceous feedstocks useful in the present process can vary within a wide boiling range. They include relatively light petroleum fractions such as kerosine, and heavier petroleum fractions such as vacuum distillates, long residues, deasphalted residual oils and atmospheric distillates, e.g. (vacuum) gas oils.

The present process may be carried out in a fixed catalyst bed but is preferably carried out in an upwardly or downwardly moving catalyst bed, e.g. in the manner of conventional Thermofor Catalytic Cracking (TCC) or Fluidised Catalytic Cracking (FCC) processes. The process conditions are preferably a reaction temperature in the range from 400 to 900° C., more preferably from 450 to 800° C. and especially from 500 to 650° C.; a total pressure of from $1 \times 10^5$ to $1 \times 10^6$ Pa (1 to 10 bar), in particular from $1 \times 10^5$ to $7.5 \times 10^5$ Pa (1 to 7.5 bar); a catalyst/feedstock weight ratio (kg/kg) in the range from 0.1 to 150, especially 20 to 100 if a moving catalyst bed is used; and a contact time between catalyst and feedstock in the range from 0.1 to 100 seconds, with contact times in the range from 0.1 to 10 seconds being preferred if a moving catalyst bed is used.

The present invention will be further understood from the following illustrative examples.

EXAMPLE 1

(i) Preparation of Swollen, Layered Oxide Material

A swollen, layered oxide material as described in Published International application No. WO 92/11934 was prepared by dissolving sodium aluminate (0.233 g, 56% alumina/37% sodium oxide, from Carlo Erba) and 98% sodium hydroxide (0.810 g, from Prolabo) in deionized water (103.45 g). To this solution were added hexamethyleneimine (6.347 g, from Aldrich) and "Aerosil 200" (trade mark) silica (7.680 g, from Degussa) and the resulting mixture was stirred vigorously for 30 minutes. The mixture produced a gel having a silicon to aluminium atomic ratio of 50 (corresponding to a silica to alumina molar ratio of 100) which was kept in an autoclave operated at 60 rpm for 11 days at 135° C. Centrifugation at 10,000 rpm followed by washing until the pH of the washing water became 9 or less and then drying yielded a swellable material of the type prepared in Example 1 of WO 92/11934.

A suspension of the swellable material (3 g) in a system containing bidistilled water (40 g), cetyltrimethylammonium hydroxide/bromide in a 1:1 ratio (60 g) and tetrapropylammonium hydroxide/bromide in a 1:1 ratio (18.5 g) was refluxed at 80° C. for 16 hours and then thoroughly washed with water before separation into a liquid phase and a solid phase (3.5 g). The solid phase comprised the desired swollen, layered oxide material of the type prepared in Example 2 of WO 92/11934 having an X-ray diffraction pattern substantially as shown in the Table II below.

TABLE II

| d (Å) | Relative Intensity, $I/I_o \times 100$ |
|---|---|
| >32.2 | vs |
| 12.41 ± 0.25 | w–s |
| 3.44 ± 0.07 | w–s |

(ii) Preparation of a Calcined, Oxide Material According to the Invention

Bidistilled water (600 ml) was added to the swollen, layered oxide material (3.5 g) obtained in Example 1 (i) above with constant stirring and the resulting suspension was subjected to an ultrasound treatment at a power of 50 W for a period of 40 minutes. The suspension thus treated was then centrifuged, dried at 100° C. and finally calcined at 540° C. for 5 hours to yield an oxide material according to the present invention (1.5 g) having an X-ray diffraction pattern as shown in Table I above and a total surface area of about 600 m$^2$/g (of which about 350 m$^2$/g is external surface area) as determined by the well known t-plot method using is nitrogen as the adsorbate.

EXAMPLE 2

The process according to Example 1 above was repeated except that the amounts of reagents in step (i) were varied to produce a gel having a silicon to aluminium atomic ratio of 15 (corresponding to a silica to alumina molar ratio of 30).

The calcined, oxide material obtained from step (ii) was found to have an X-ray diffraction pattern as shown in Table I above and a total surface area of over 500 m$^2$/g (of which about 250 m$^2$/g is external surface area).

EXAMPLE 3

The process according to Example 2 above was repeated except that in step (i) the suspension containing the swellable material of the type prepared in Example 1 of WO 92/11934, bidistilled water, cetyltrimethylammonium hydroxide/bromide and tetrapropylammonium hydroxide/bromide was heated in an autoclave at 105° C. for 42 hours.

The calcined, oxide material obtained from step (ii) was found to have an X-ray diffraction pattern as shown in Table I above and a total surface area of 400 m$^2$/g (of which about 230 m$^2$/g is external surface area).

EXAMPLE 4

The process according to Example 3 above was repeated except that in step (i) the suspension containing the swellable material of the type prepared in Example 1 of WO 92/11934, bidistilled water, cetyltrimethylammonium hydroxide/bromide and tetrapropylammonium hydroxide/bromide was heated in an autoclave at 105° C. for 42 hours, washed with water and then finally with aqueous 6 N hydrochloric acid before separation into a liquid phase and a solid phase.

The calcined, oxide material obtained from step (ii) was found to have an X-ray diffraction pattern as shown in Table I above and a total surface area of 520 m$^2$/g (of which about 300 m$^2$/g is external surface area).

EXAMPLE 5

The process according to Example 1 above was repeated except that in step (ii), following the ultrasound treatment, the suspension was lyophilised prior to calcination.

EXAMPLE 6

The first step of the process described in Example 1 was repeated to yield a swollen, layered oxide material of the type prepared in Example 2 of WO 92/11934 having an X-ray diffraction pattern substantially as shown in the Table II above.

In a second step, bidistilled water (300 ml) was added to the swollen, layered oxide material (3.0 g) obtained in the first step with constant stirring and the resulting suspension was subjected to an ultrasound treatment at a power of 50 W for a period of 1 hour. The suspension was then acidified with 6M hydrochloric acid until a pH of 2 was reached, washed with water and centrifuged several times until a pH≧6 was obtained. Drying at 100° C. followed by calcination at 540° C. for 5 hours yielded an oxide material according to the present invention (2.25 g) having an X-ray diffraction pattern as shown in Table I above and a total surface area of 841 m$^2$/g (of which 796 m$^2$/g is external surface area).

EXAMPLE 7

Cracking Experiments

A vacuum gasoil feedstock was cracked in an automated microactivity test (MAT) reactor that accomplishes standard test method ASTM D-3907 using, as cracking catalyst, 1 g of a calcined, oxide material as prepared in Example 6 above via an initial gel having a silicon to aluminium atomic ratio of 50, diluted with 2 g of a silica matrix (a catalyst according to the invention, hereinafter referred to as C$_I$).

For comparison, the test was repeated using, as cracking catalyst, 1 g of MCM-22 zeolite prepared as described in U.S. Pat. No. 4,954,325 via an initial gel having a silicon to aluminium atomic ratio of 50, diluted with 2 g of the silica matrix (a comparative catalyst, hereinafter referred to as CC).

The tests on both catalysts were carried out at different catalyst/oil weight ratios but the contact time (time on stream) remained the same. The properties of the vacuum gas oil, the process conditions used and the results obtained for each catalyst are shown in the following Tables III and IV. In Table IV, conversion is defined as the sum of the C$_1$–C$_4$ gas, gasoline (C$_5$-195° C. fraction), middle distillates (195–360 fraction) and coke yields, the yields quoted being calculated as per cent by weight on the feedstock.

TABLE III

| Properties of vacuum gas oil feedstock | |
|---|---|
| Density (g/cm$^3$ at 60° C.) | 0.873 |
| API gravity | 30.68 |
| Nitrogen content (ppm) | 370 |
| Sulphur content (% w) | 1.65 |
| Conradson Carbon (% w) | 0.03 |
| Viscosity at 50° C. (cSt) | 8.249 |
| Distillation Range (° C.): | |
| Initial Boiling Point | 167 |
| 5% w | 245 |

TABLE III-continued

Properties of vacuum gas oil feedstock

| | |
|---|---|
| 10% w | 281 |
| 20% w | 304 |
| 30% w | 328 |
| 40% w | 345 |
| 50% w | 363 |
| 60% w | 380 |
| 70% w | 401 |
| 80% w | 425 |
| 90% w | 450 |
| Final Boiling Point | 551 |

EXAMPLE 9

Cracking Experiments

The oxide material obtained in Example 8 above (via an initial gel having a silicon to aluminium atomic ratio of 50) was formulated into a cracking catalyst according to the invention (1 g oxide material and 2 g silica matrix) and tested as previously described in Example 7 using the same vacuum gas oil feedstock at a temperature of 500° C. and a time on stream of 75 seconds. The cracking catalyst is hereinafter referred to as $C_{IH}$.

For comparison, the test was repeated using a similar cracking catalyst containing instead of the oxide material of Example 8, 1 g of MCM-22 zeolite prepared as described in U.S. Pat. No. 4,954,325 via an initial gel having a silicon to aluminium atomic ratio of 50 which had likewise been

TABLE IV

| Test Run | 1 | 1A | 2 | 2A | 3 | 3A | 4 | 4A | 5 | 5A |
|---|---|---|---|---|---|---|---|---|---|---|
| Catalyst | $C_I$ | $C_C$ | $C_I$ | $C_C$ | $C_I$ | $C_C$ | $C_I$ | $C_C$ | $C_I$ | $C_C$ |
| Temp. (° C.) | 500 | 500 | 500 | 500 | 500 | 500 | 500 | 500 | 500 | 500 |
| Catalyst/Oil (wt/wt) | 0.135 | 0.133 | 0.202 | 0.208 | 0.266 | 0.278 | 0.340 | 0.345 | 0.403 | 0.415 |
| Time on stream (s) | 75 | 75 | 75 | 75 | 75 | 75 | 75 | 75 | 75 | 75 |
| Conversion (% w) | 37.94 | 27.38 | 45.20 | 34.53 | 50.45 | 40.78 | 55.31 | 45.54 | 59.51 | 47.30 |
| $C_1$–$C_4$ gases (% w) | 8.96 | 7.96 | 12.63 | 11.24 | 15.87 | 14.17 | 18.89 | 16.89 | 21.99 | 20.49 |
| Gasoline (% w) | 20.21 | 13.87 | 22.91 | 15.84 | 24.18 | 18.01 | 25.37 | 19.03 | 26.20 | 17.96 |
| Middle distillates (% w) | 7.76 | 4.56 | 8.12 | 5.96 | 8.37 | 6.63 | 8.96 | 7.14 | 8.86 | 5.90 |
| Coke (% w) | 1.01 | 0.99 | 1.54 | 1.49 | 2.03 | 1.97 | 2.09 | 2.46 | 2.44 | 2.96 |

As the results in Table IV clearly show, the catalyst according to the invention ($C_I$) was significantly more active than the comparative catalyst ($C_C$) and produced higher gasoline and middle distillates yields with less coke formation. Indeed, the catalyst according to the invention gave a better distribution of products. Furthermore, although not shown in Table IV, the catalyst according to the invention gave a more advantageous gaseous product containing higher propylene/propane, butene/butane and isobutene/butene ratios than the gaseous product obtained using the comparative catalyst.

subjected to a hydrothermal treatment step at 750° C. and 100% steam for 5 hours. The comparative cracking catalyst is hereinafter referred to as $C_{CH}$.

The catalyst/oil weight ratios used and the results obtained for each catalyst are shown in the following Table V, in which conversion is defined as the sum of the $C_1$–$C_4$ gas, gasoline, middle distillates and coke yields, the yields quoted being calculated as per cent by weight on the feedstock. As will be observed from Table V the catalyst according to the invention ($C_{IH}$) shows improved activity relative to the comparative catalyst ($C_{CH}$) and produces considerably less coke.

TABLE V

| Test Run | 6 | 6A | 7 | 7A | 8 | 8A | 9 | 9A | 10 | 10A |
|---|---|---|---|---|---|---|---|---|---|---|
| Catalyst | $C_{IH}$ | $C_{CH}$ | $C_{IH}$ | $C_{CH}$ | $C_{IH}$ | $C_{CH}$ | $C_{IH}$ | $C_{CH}$ | $C_{IH}$ | $C_{CH}$ |
| Catalyst/Oil (wt/wt) | 0.138 | 0.140 | 0.210 | 0.211 | 0.285 | 0.280 | 0.355 | 0.352 | 0.421 | 0.421 |
| Conversion (% w) | 25.70 | 24.37 | 29.86 | 28.16 | 32.46 | 31.85 | 34.97 | 34.41 | 38.08 | 37.51 |
| $C_1$–$C_4$ gases (% w) | 2.63 | 2.80 | 3.89 | 4.08 | 4.94 | 5.08 | 5.84 | 6.20 | 6.59 | 7.07 |
| Gasoline (% w) | 13.91 | 14.20 | 15.77 | 15.99 | 16.49 | 17.43 | 17.57 | 18.77 | 18.38 | 19.27 |
| Middle distillates (% w) | 8.69 | 6.59 | 9.49 | 7.05 | 10.15 | 8.06 | 10.54 | 9.02 | 11.84 | 9.62 |
| Coke (% w) | 0.47 | 0.76 | 0.71 | 1.04 | 0.88 | 1.28 | 1.02 | 1.42 | 1.27 | 1.55 |

EXAMPLE 8

The process according to Example 6 was repeated with an additional post-calcination hydrothermal treatment step carried out at 750° C. and 100% steam for 5 hours.

EXAMPLE 10

The process according to Example 1 was repeated with additional post-calcination phosphorus and hydrothermal treatment steps. Thus, the calcined, oxide material obtained was contacted with a solution of ammonium dihydrogenphosphate, (NH$_4$)H$_2$PO$_4$, in deionized water to add 2% w phosphorus. The material so treated was dried in a rotary vacuum evaporator at 80° C. and then subjected to a hydrothermal treatment at 750°C. and 100% steam for 5 hours.

EXAMPLE 11

Cracking Experiments

The phosphorus-containing oxide material obtained in Example 10 above was formulated into a cracking catalyst according to the invention (1 g oxide material and 2 g silica matrix) and tested as previously described in Example 7 using the same vacuum gas oil feedstock at a temperature of 500° C. and a time on stream of 75 seconds.

The catalyst/oil weight ratios used and the results obtained are shown in the following Table VI, in which conversion is defined as the sum of the C$_1$–C$_4$ gas, gasoline, middle distillates and coke yields, the yields quoted being calculated as per cent by weight on the feedstock.

TABLE VI

| Test Run | 11 | 12 | 13 | 14 | 15 |
|---|---|---|---|---|---|
| Catalyst/Oil (wt/wt) | 0.140 | 0.209 | 0.280 | 0.350 | 0.421 |
| Conversion % w) | 22.51 | 27.94 | 32.14 | 35.46 | 38.64 |
| C$_1$–C$_4$ gases (% w) | 2.91 | 3.96 | 5.25 | 6.45 | 7.41 |
| Gasoline (% w) | 13.08 | 15.57 | 17.39 | 18.44 | 19.93 |
| Middle distillates (% w) | 5.98 | 7.57 | 8.29 | 8.95 | 9.57 |
| Coke (% w) | 0.59 | 0.84 | 1.21 | 1.62 | 1.73 |

What is claimed is:

1. A non-pillared oxide material, produced by a process comprising:
   at least partially delaminating a swollen, layered oxide material; and then
   calcining the oxide material to provide:
      channels formed by 10-membered atomic rings having a pore diameter of 0.56 nm and 0.8×0.7 nm chalice-shaped cavities which are open to the outside via 12-membered atomic rings, and
      an adsorption capacity for 1,3,5-trimethylbenzene of at least 0.50 mmol/g at a temperature of 42° C. and a pressure of 173.3 Pa.

2. The non-pillared oxide material of claim 1 wherein an external surface area, as measured by the t-plot method using nitrogen as absorbate, is at least 230 m$^2$/g.

3. The non-pillared oxide material of claim 2 wherein the external surface area is in the range of from 230 m$^2$/g to 796 m$^2$/g.

4. The non-pillared oxide material of claim 1 comprising the oxides XO$_2$ and Y$_2$O$_3$ wherein X represents a tetravalent element and Y represents a trivalent element, wherein the atomic ratio of X to Y is at least 10.

5. The non-pillared oxide material of claim 4 wherein X represents at least one tetravalent element selected from the group consisting of silicon and germanium.

6. The non-pillared oxide material of claim 5 wherein X represents silicon and Y represents aluminum.

7. The non-pillared oxide material of claim 4 wherein Y represents at least one trivalent element selected from the group consisting of aluminum, boron, iron, chromium and gallium.

8. The non-pillared oxide material of claim 4 wherein the atomic ratio of X to Y is from 10 to 500.

9. The non-pillared oxide material of claim 4 wherein the atomic ratio of X to Y is from 10 to 350.

10. The non-pillared oxide material claim of claim 9 wherein the atomic ratio of X to Y is from 10 to 150.

11. A catalyst composition comprising an oxide material of claim 1 and a matrix material.

12. A catalyst composition of claim 11, wherein the matrix material is a refractory oxide.

13. A process for catalytically cracking a hydrocarbonceous feedstock, comprising contacting the feedstock at an elevated temperature with a catalyst composition of claim 11.

14. A process for the preparation of a non-pillared oxide material, comprising at least partially delaminating a swollen, layered oxide material prior to calcination, the oxide material having an X-ray diffraction pattern including values substantially as set forth in the Table below:

| d (Angstrom) | Relative Intensity, I/I$_o$ × 100 |
|---|---|
| >32.2 | vs (verystrong) |
| 12.41 ± 0.25 | w–s (weaktostrong) |
| 3.44 ± 0.07 | w–s (weaktostrong). |

15. The process of claim 14 wherein the swollen, layered oxide material is at least partially delaminated using ultrasound techniques.

16. The process of claim 15 further comprising an acid treatment after the oxide material is at least partially delaminated.

17. The process of claim 14 further comprising calcining the oxide material and hydrothermally treating the calcined oxide material.

18. The process of claim 14 further comprising calcining the oxide material and treating the calcined oxide material with fluorine, phosphorus, or a combination thereof.

19. A non-pillared oxide material prepared by the process of claim 14.

20. A non-pillared oxide material produced by a process, comprising at least partially delaminating a swollen, layered oxide material prior to calcination, the oxide material having an X-ray diffraction pattern including values substantially as set forth in the Table below:

| d (Angstrom) | Relative Intensity, I/I$_o$ × 100 |
|---|---|
| >32.2 | vs (verystrong) |
| 12.41 ± 0.25 | w–s (weaktostrong) |
| 3.44 ± 0.07 | w–s (weaktostrong). |

* * * * *

UNITED STATES PATENT AND TRADEMARK OFFICE
CERTIFICATE OF CORRECTION

PATENT NO. : 6,231,751 B1
DATED : May 15, 2001
INVENTOR(S) : Canos et al.

Page 1 of 1

It is certified that error appears in the above-identified patent and that said Letters Patent is hereby corrected as shown below:

Column 1,
Line 64, please replace "of least" with -- of at least --.

Column 2,
Line 31, please insert "and" between "C." and "666.61".

Column 7,
Line 30, please delete "is".

Column 8,
Line 53, please replace "360" with -- 360 degrees C. --.

Column 9,
Table IV, under 1A, for Catalyst/Oil, please replace "0.133" with -- 0.139 --.

Signed and Sealed this

Twenty-third Day of April, 2002

Attest:

JAMES E. ROGAN
Attesting Officer    Director of the United States Patent and Trademark Office